(12) United States Patent
Tarukawa et al.

(10) Patent No.: US 10,473,219 B2
(45) Date of Patent: Nov. 12, 2019

(54) SEALING STRUCTURE

(71) Applicant: NOK CORPORATION, Tokyo (JP)

(72) Inventors: Yuichi Tarukawa, Fukushima (JP); Takaharu Saza, Fukushima (JP); Atsushi Suzuki, Fukushima (JP); Go Kanzaki, Fukushima (JP)

(73) Assignee: NOK CORPORATION, Tokyo (JP)

( * ) Notice: Subject to any disclaimer, the term of this patent is extended or adjusted under 35 U.S.C. 154(b) by 113 days.

(21) Appl. No.: 15/901,189

(22) Filed: Feb. 21, 2018

(65) Prior Publication Data

US 2018/0180184 A1 Jun. 28, 2018

Related U.S. Application Data

(63) Continuation of application No. PCT/JP2016/075166, filed on Aug. 29, 2016.

(30) Foreign Application Priority Data

Sep. 3, 2015 (JP) .................................. 2015-174180

(51) Int. Cl.
*F16J 15/32* (2016.01)
*F16J 15/3232* (2016.01)
(Continued)

(52) U.S. Cl.
CPC ....... *F16J 15/3232* (2013.01); *F16J 15/3256* (2013.01); *F16J 15/447* (2013.01)

(58) Field of Classification Search
CPC ..... F16J 15/3232; F16J 15/3256; F16J 15/447
See application file for complete search history.

(56) References Cited

U.S. PATENT DOCUMENTS 7,806,412 B2 * 10/2010 Nakagawa ........... F16J 15/3256
  277/552
2004/0228558 A1 11/2004 Cha et al.
(Continued)

FOREIGN PATENT DOCUMENTS

CN 202251974 U 5/2012
DE 38 26 628 A1 2/1990
(Continued)

OTHER PUBLICATIONS

Decision to Grant a Patent dated Jan. 23, 2017 for corresponding Japanese Application No. 2016-568074.
(Continued)

*Primary Examiner* — Gilbert Y Lee
(74) *Attorney, Agent, or Firm* — Pearne & Gordon LLP

(57) ABSTRACT

In a sealing structure, a sealing device seals a space between a rotational body and a shaft. The sealing device includes an inner side seal portion, an outer side seal portion, and a dust cover. An inner side seal lip of the inner side seal portion extends from an inner side attachment ring toward an outer side and slidably abuts a contacted portion. The outer side seal portion includes the outer side seal lip, and a side lip on an outer peripheral side of the outer side seal lip, and the outer side seal lip and the side lip extend from the outer side attachment ring toward the outer side and slidably abut the dust cover. The dust cover forms a gap between the dust cover and a flange portion of a bracket to which the inner side attachment ring is attached.

5 Claims, 2 Drawing Sheets

(51) Int. Cl.
*F16J 15/447* (2006.01)
*F16J 15/3256* (2016.01)

(56) References Cited

U.S. PATENT DOCUMENTS

| | | | |
|---|---|---|---|
| 2011/0006485 A1 | 1/2011 | Nakagawa | |
| 2011/0221140 A1 | 9/2011 | Nakagawa | |
| 2017/0122438 A1* | 5/2017 | Hamamoto | ............. F16J 15/32 |

FOREIGN PATENT DOCUMENTS

| | | | |
|---|---|---|---|
| JP | S62-139705 U1 | 9/1987 | |
| JP | H5-094573 U | 12/1993 | |
| JP | H06-078666 U | 11/1994 | |
| JP | 2013-113319 A | 6/2013 | |
| JP | 2014-214831 A | 11/2014 | |
| WO | 2009/130933 A1 | 10/2009 | |
| WO | 2010/061688 A1 | 6/2010 | |
| WO | 2013/077010 A1 | 5/2013 | |
| WO | WO-2013077010 A1 * | 5/2013 | ........... F16J 15/3264 |

OTHER PUBLICATIONS

Korean Office Action dated Jun. 17, 2019 for corresponding Korean Application No. 10-2018-7005601.
Notification for Granting an Invention Patent dated Sep. 14, 2018 in corresponding Chinese Application No. 201680048751.8 and English translation.
English Translation of Written Opinion for corresponding International Application No. PCT/JP2016/075166 dated Oct. 11, 2016.
International Preliminary Report on Patentability for corresponding International Application No. PCT/JP2016/075166 dated Mar. 6, 2018.
International Search Report for corresponding International Application No. PCT/JP2016/075166 dated Oct. 11, 2016.
Written Opinion for corresponding International Application No. PCT/JP2016/075166 dated Oct. 11, 2016.
Chinese Office Action dated Jul. 5, 2018 for corresponding Chinese Application No. 201680048751.8.
Extended European Search Report for corresponding European Application No. 16841784.8 dated Feb. 22, 2019.

* cited by examiner

SEALING STRUCTURE

CROSS REFERENCE TO RELATED APPLICATIONS

The present application is a continuation application of International Application No. PCT/JP2016/075166, filed on Aug. 29, 2016, which claims priority to Japanese Patent Application No. 2015-174180, filed on Sep. 3, 2015. The contents of these applications are incorporated herein by reference in their entirety.

BACKGROUND

Technical Field

The present disclosure relates to a sealing structure, and particularly relates to a sealing structure in which replenishment of lubricant used for, for example, a suspension of a truck is performed.

Background Art

Conventionally, in a mechanism having a rotational axis, a sealing structure has been used to achieve prevention of an entrance of foreign matter such as muddy water, rainwater, and dust from the outside while achieving prevention of leakage of lubricant from the inside, and examples of such sealing structures include a sealing structure in which replenishment of lubricant from the outside is possible. For example, in a trunnion suspension used for a rear wheel of a truck, a sealing structure is provided to seal a space between a shaft attached to a frame of a vehicle body and an attachment hole of a leaf spring into which the shaft is inserted in a freely rotatable manner. The space between the shaft and the attachment hole of the leaf spring is provided with a sliding bearing and filled with lubricant to form a slide portion, and the sealing structure is provided to achieve prevention of leakage of the lubricant from the slide portion and prevention of entrance of any foreign matter from the outside into the slide portion. Examples of such a conventional sealing structure include a sealing structure that allows supply (replenishment) of lubricant from the outside (see Japanese Utility Model Application Publication 62-139705, for example).

In such a conventional sealing structure at the trunnion suspension of a truck, a seal lip of a sealing device, which is formed of an elastic body that directly or indirectly abuts, for example, an outer peripheral surface of a trunnion shaft in a slidable manner. Accordingly, sealing of a space between the trunnion shaft and the leaf spring is achieved, and prevention of leakage of the lubricant and prevention of entrance of any foreign matter into the inside are achieved. The lubricant is applied to the seal lip, and the seal lip is supplied and replenished with the lubricant along with replenishment of the slide portion of the trunnion shaft with the lubricant in response to consumption of the lubricant. The seal lip is pressed and moved by the lubricant supplied from the inside upon the replenishment of the lubricant, and the seal lip extends toward the outer sides so that the seal lip does not deform and roll back upon the replenishment.

In such a conventional sealing structure, achievement of prevention of entrance of any foreign matter from the outer side is attempted while preventing abrasion of the slide portion between the seal lip and the trunnion shaft by supply of lubricant. However, maintenance of a sealing performance under a more severe environment has been required for the sealing structure due to diversification of use environment of vehicles such as a truck, and further improvement of sealing performance against foreign matter has been required.

The present disclosure is related to provide a sealing structure that can improve sealing performance against foreign matter such as muddy water, rainwater, and dust.

SUMMARY

A sealing structure according to the present disclosure is a sealing structure for sealing a space between a shaft extending in an axis direction and a rotational body in which a through-hole extending in the axis direction is formed and the shaft is inserted through the through-hole with a space, the sealing structure includes a sealing device attached to one of the shaft and the rotational body in a relatively irrotational manner, and a contacted portion formed in the other of the shaft and the rotational body in a relatively irrotational manner. The sealing device includes an inner side seal portion, an outer side seal portion, and a dust cover. The contacted portion includes a peripheral surface in an annular shape centered about the axis. The inner side seal portion includes an inner side attachment ring having an annular shape centered about the axis and attached to the one of the shaft and the rotational body in a relatively irrotational manner, and an inner side seal lip formed of an elastic body having an annular shape centered about the axis and attached to the inner side attachment ring, the inner side seal lip extends from the inner side attachment ring toward an outer side that is a side toward which one direction along the axis direction faces, and slidably abuts the contacted portion at a part on the outer side. The outer side seal portion includes an outer side attachment ring having an annular shape centered about the axis and fitted to the inner side attachment ring of the inner side seal portion, an outer side seal lip formed of an elastic body having an annular shape centered about the axis and attached to the outer side attachment ring, and a side lip formed of an elastic body having an annular shape centered about the axis and attached to the outer side attachment ring on a side separate from the contacted portion than the outer side seal lip, the outer side seal lip is positioned on the outer side of the inner side seal lip, extends from the outer side attachment ring toward the outer side, and slidably abuts the dust cover at a part on the outer side, the side lip extends from the outer side attachment ring toward the outer side and slidably abuts the dust cover at an end portion on the outer side. The dust cover is an annular member attached to a peripheral surface of the contacted portion and forms a gap between the dust cover and a member to which the inner side attachment ring is attached.

In the sealing structure according to an aspect of the present disclosure, the peripheral surface of the contacted portion includes an annular transition portion that approaches toward an sealing device side as the peripheral surface progresses toward the outer side, and the transition portion is positioned between the inner side seal lip and the outer side seal lip.

In the sealing structure according to an aspect of the present disclosure, the sealing device is fitted to a bracket holding the shaft on an outer peripheral side, the contacted portion is formed at an end portion of the rotational body on an inner side, the peripheral surface of the contacted portion is a surface facing toward the outer peripheral side, and the dust cover forms the gap between the dust cover and the bracket at an end portion on the outer peripheral side.

In the sealing structure according to an aspect of the present disclosure, in the outer side attachment ring, a part to which the side lip is attached is positioned on an inner side of an end portion, on the outer side, of a part attached to the inner side attachment ring.

In the sealing structure according to an aspect of the present disclosure, the dust cover is made of stainless steel.

A sealing structure according to the present disclosure can improve sealing performance for foreign matter such as muddy water, rainwater, and dust.

DETAILED DESCRIPTION

An embodiment of the present disclosure will be described below in detail with reference to the drawings.

Figure 1:
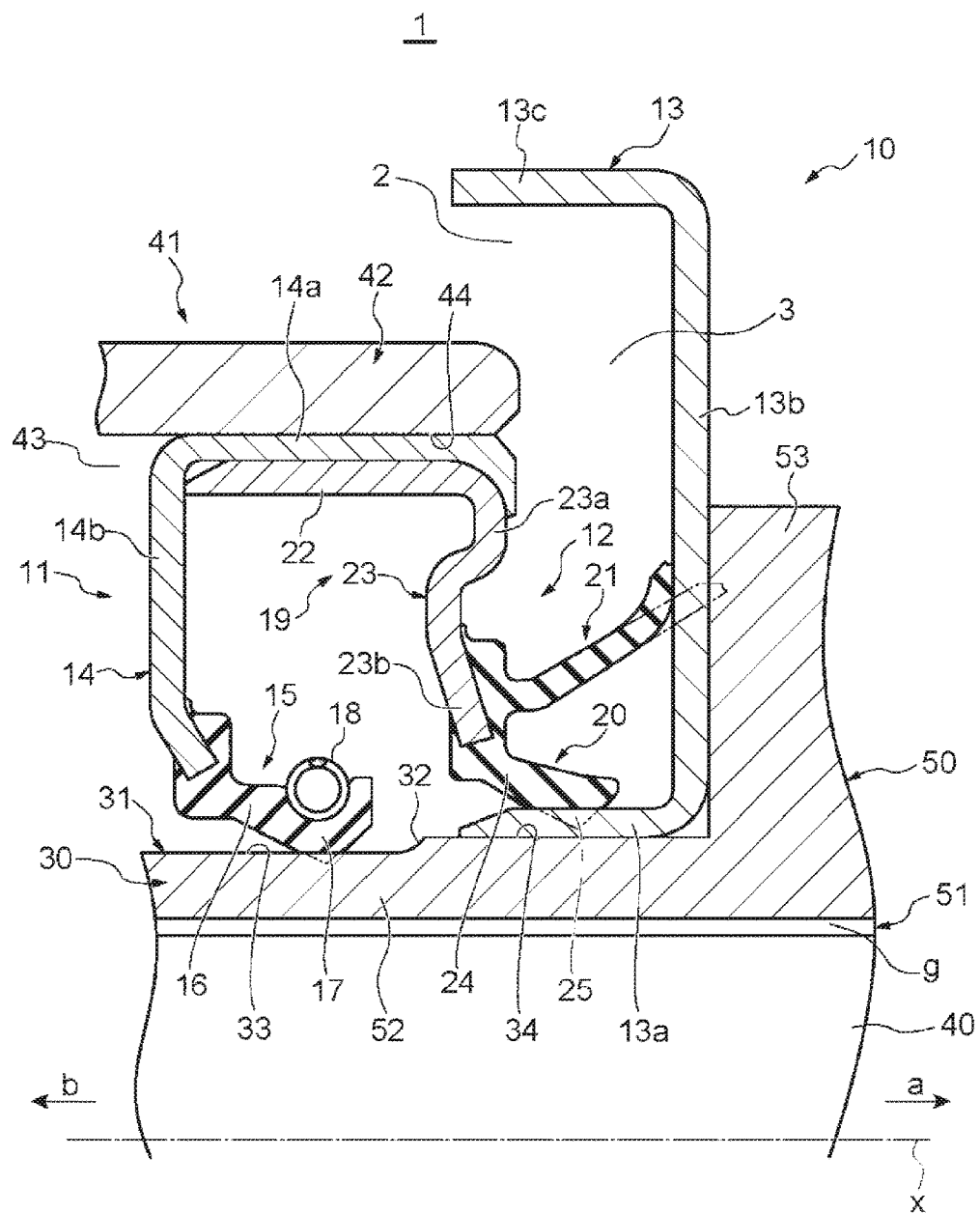
FIG. 1 is a cross-sectional view at a section along an axis x for illustrating a schematic configuration of a sealing structure according to an embodiment of the present disclosure.

FIG. 1 is a cross-sectional view at a section along an axis x for illustrating a schematic configuration of a sealing structure 1 according to an embodiment of the present disclosure. In FIG. 1, a part of a section along the axis x (hereinafter also simply referred to as a "section") of the sealing structure 1 is illustrated. The sealing structure 1 according to the present embodiment is a sealing structure for sealing a space between a trunnion shaft and a rotational body on which a leaf spring is held at a trunnion suspension of a truck.

As illustrated in FIG. 1, the sealing structure 1 includes a sealing device 10 and a contacted portion 30, and is used to seal a space between a shaft 40 as a trunnion shaft extending in the direction of the axis x and a rotational body 50 as a spring sheet. Specifically, a leaf spring (not illustrated) is attached to the rotational body 50 and held by the rotational body 50, and a through-hole 51 extending in the direction of the axis x is formed in the rotational body 50. The shaft 40 is inserted through the through-hole 51 of the rotational body 50 with a space. The sealing structure 1 seals a space g between the rotational body 50 and the shaft 40. The shaft 40 is fixed to a bracket 41 fixed to a frame of a vehicle body (not illustrated), the bracket 41 includes an annular flange portion 42 centered about the axis x and covering the shaft 40 on an outer peripheral side, and a space 43 on an inner peripheral side of the flange portion 42 communicates with the space g between the rotational body 50 and the shaft 40 on an inner side. In the trunnion suspension, the sealing device 10 is attached to one of the shaft 40 and the rotational body 50 in a relatively irrotational manner, and the contacted portion 30 is formed in the other of the shaft 40 and the rotational body 50 in a relatively irrotational manner. An outer side is assumed as a side toward which one direction (the direction of arrow a in FIG. 1) along the direction of the axis x faces, and the inner side is assumed as a side toward which the other direction (the direction of arrow b in FIG. 1) along the direction of the axis x faces. In other words, the outer side is a side toward which the shaft 40 extends relative to the bracket 41.

Specifically, the rotational body 50 accommodates a part of the shaft 40 in the through-hole 51, and is freely rotatable about the shaft 40, and a leaf spring is fixed to the rotational body 50 by, for example, a U bolt. The rotational body 50 allows the leaf spring to swing about a center at the shaft 40. As illustrated in FIG. 1, an inner side end portion 52 as a part of an edge of the rotational body 50 on the inner side has a cylindrical shape centered about the axis x, and the flange portion 42 of the bracket 41 surrounds the inner side end portion 52 on the outer peripheral side, thereby forming the space 43. A sliding bearing (not illustrated) such as a metal bush is provided to form a slide portion in the space g between the rotational body 50 and the shaft 40, and the space g is filled with lubricant and lubricant is applied on the sliding bearing. The lubricant is, for example, grease. Accordingly, the rotational body 50 can smoothly rotate around the shaft 40. For example, a groove extending along the axis x is formed in the sliding bearing, and the grease can be supplied to the sliding bearing through a lubricant supply port (not illustrated) provided to the rotational body 50, and the grease can be supplied to the sealing device 10. The grease can be discharged through a lubricant discharge port, not illustrated, provided to the rotational body 50.

The sealing device 10 includes an inner side seal portion 11, an outer side seal portion 12, and a dust cover 13. The sealing device 10 is attached in a manner relatively irrotational against the shaft 40 in the present embodiment, and, specifically, is fitted to an inner peripheral surface 44 of the flange portion 42 of the bracket 41 as illustrated in FIG. 1. The contacted portion 30 includes an annular peripheral surface 31 centered about the axis x, and in the present embodiment, the contacted portion 30 is formed in a relatively irrotational manner relative to the rotational body 50, and specifically, as illustrated in FIG. 1, is formed in the inner side end portion 52 of the rotational body 50, and the peripheral surface 31 of the contacted portion 30 forms an outer peripheral surface of the inner side end portion 52 of the rotational body 50.

The inner side seal portion 11 includes an annular inner side attachment ring 14 centered about the axis x and fitted to the inner peripheral surface 44 of the flange portion 42 of the bracket 41 on the outer peripheral side, and an inner side seal lip 15 formed of an annular elastic body centered about the axis x and attached to the inner side attachment ring 14 on the inner peripheral side. The inner side seal lip 15 extends from the inner side attachment ring 14 toward the outer side and slidably abuts the peripheral surface 31 of the contacted portion 30 at an end portion on the outer side. More specifically, the peripheral surface 31 of the contacted portion 30 slidably contacts the inner side seal lip 15.

In the inner side seal portion 11, specifically, as illustrated in FIG. 1, the inner side attachment ring 14 is substantially L-shaped in a sectional shape, and includes a cylinder portion 14a that is a cylindrical part extending in the direction of the axis x, and a flange portion 14b that is a part having a circular ring plate shape extending from an end portion of the cylinder portion 14a on the inner side toward the inner peripheral side. The cylinder portion 14a of the inner side attachment ring 14 is pressed and fitted to the space 43 that the flange portion 42 of the bracket 41 forms, and an outer peripheral surface of the cylinder portion 14a makes close contact with the inner peripheral surface 44 of the flange portion 42. Accordingly, the inner side attachment ring 14 is fitted to the bracket 41. The inner side seal lip 15 is attached to an end portion of the flange portion 14b of the inner side attachment ring 14 on the inner peripheral side.

Specifically, the inner side seal lip 15 includes an annular lip base portion 16 extending in the direction of the axis x, and an annular lip tip portion 17 formed at an end portion of the lip base portion 16 on the outer side. The lip base portion 16 is attached to the flange portion 14b of the inner side attachment ring 14 at an end portion on the inner side. The lip tip portion 17 is an annular part having a wedge shape, a sectional shape of which is convex toward the inner peripheral side, and slidably abuts the peripheral surface 31 of the contacted portion 30. In other words, the peripheral surface 31 of the contacted portion 30 slidably contacts the lip tip portion 17. A garter spring 18 is fitted onto the outer peripheral side of the inner side seal lip 15 at a position facing away from the lip tip portion 17, and the garter spring 18 presses the lip tip portion 17 of the inner side seal lip 15 toward the inner peripheral side in a radial direction and provides the lip tip portion 17 with tension force having a predetermined magnitude toward the contacted portion 30. The lip tip portion 17 abuts the peripheral surface 31 of the contacted portion 30 as described later, and achieves sealing between the inner side seal portion 11 and the contacted portion 30.

The outer side seal portion 12 includes an annular outer side attachment ring 19 centered about the axis x and fitted to the inner side attachment ring 14 of the inner side seal portion 11 on the outer peripheral side, and an outer side seal lip 20 formed of an annular elastic body centered about the axis x and attached to the outer side attachment ring 19 on the inner peripheral side. The outer side seal portion 12 includes a side lip 21 formed of an annular elastic body centered about the axis x and attached to the outer side attachment ring 19 on the outer peripheral side that is a side further separated from the contacted portion 30 than the outer side seal lip 20. The outer side seal lip 20 extends from the outer side attachment ring 19 toward the outer side and slidably abuts the dust cover 13 at an end portion on the outer side as described later, and the side lip 21 extends from the outer side attachment ring 19 toward the outer side and slidably abuts the dust cover 13 at an end portion on the outer side.

Specifically, in the outer side seal portion 12, the outer side attachment ring 19 is substantially L-shaped in sectional shape and includes a cylinder portion 22 that is a cylindrical part extending in the direction of the axis x, and a flange portion 23 that is a part having a substantially circular ring plate shape and extending from an end portion of the cylinder portion 22 on the outer side toward the inner peripheral side. The cylinder portion 22 of the outer side attachment ring 19 is pressed and fitted to the inner peripheral side of the cylinder portion 14a of the inner side attachment ring 14 fitted to the bracket 41, and an outer peripheral surface of the cylinder portion 22 closely contacts an inner peripheral surface of the cylinder portion 14a of the inner side attachment ring 14. Accordingly, the outer side attachment ring 19 is fitted to the inner side seal portion 11. The outer side seal lip 20 is attached to an end portion of the flange portion 23 of the outer side attachment ring 19 on the inner peripheral side, and the side lip 21 is attached to the outer peripheral side of the outer side seal lip 20 in the outer side attachment ring 19.

Specifically, the outer side seal lip 20 includes an annular seal base portion 24 extending toward the outer side, and an annular lip tip portion 25 formed at an end portion of the seal base portion 24 on the outer side. The seal base portion 24 is attached to the flange portion 23 of the outer side attachment ring 19 at an end portion on the inner side. The lip tip portion 25 is an annular part having a wedge shape, a sectional shape of the lip tip portion 25 is convexed toward the inner peripheral side, and as described later, the lip tip portion 25 slidably abuts the dust cover 13, thereby achieving sealing between the outer side seal portion 12 and the dust cover 13.

Specifically, the side lip 21 is an annular elastic member obliquely extending from the flange portion 23 of the outer side attachment ring 19 toward the outer side and the outer peripheral side, and has a circular cone tubular shape extending toward the outer side centered about the axis x. As illustrated in FIG. 1, the side lip 21 is integrally formed of a material identical to that of the outer side seal lip 20. Thus, the side lip 21 connects with the lip base portion 24 of the outer side seal lip 20 at an end portion on the inner side.

The inner side attachment ring 14 of the inner side seal portion 11 and the outer side attachment ring 19 of the outer side seal portion 12 described above are each formed of a metal material, and examples of the metal material include stainless steel and SPCC (cold rolled steel sheet). Examples of the elastic body of the inner side seal lip 15 of the inner side seal portion 11, the outer side seal lip 20 of the outer side seal portion 12, and the side lip 21 include various rubber materials. Examples of the various rubber materials include synthetic rubbers such as nitrile rubber (NBR), hydrogenated nitrile rubber (H-NBR), acrylic rubber (ACM), and fluororubber (FKM).

The inner side attachment ring 14 and the outer side attachment ring 19 are manufactured by, for example, press working or forging, and the inner side seal lip 15, the outer side seal lip 20, and the side lip 21 are each molded with a mold by cross-linking (vulcanization). During the cross-linking, the inner side attachment ring 14 and the outer side attachment ring 19 are each placed in the mold, the inner side seal lip 15 is bonded to the inner side attachment ring 14 by cross-linking bonding, the outer side seal lip 20 and the side lip 21 are bonded to the outer side attachment ring 19 by cross-linking bonding, the inner side seal lip 15 is molded integrally with the inner side attachment ring 14, and the outer side seal lip 20 and the side lip 21 are molded integrally with the outer side attachment ring 19.

The dust cover 13 is an annular member attached to the peripheral surface 31 of the contacted portion 30, and forms a gap between the dust cover 13 and a member to which the inner side attachment ring 14 is attached. In other words, in the present embodiment, the dust cover 13 forms a gap between the dust cover 13 and the flange portion 42 of the bracket 41. Specifically, the dust cover 13 is substantially C-shaped (U-shaped) in a sectional shape, and includes an inner peripheral flange portion 13a that is a cylindrical part extending in the direction of the axis x on the inner peripheral side, a circular ring portion 13b that is a part having a circular ring plate shape and extending from an end portion of the inner peripheral flange portion 13a on the outer side toward the outer peripheral side, and an outer peripheral flange portion 13c that is a cylindrical part extending from an end portion of the circular ring portion 13b on the outer peripheral side toward the inner side. The inner peripheral flange portion 13a of the dust cover 13 is pressed and fitted into the contacted portion 30, and an inner peripheral surface of the inner peripheral flange portion 13a closely contacts the peripheral surface 31 of the contacted portion 30. Accordingly, the dust cover 13 is fitted and fixed to the contacted portion 30. The dust cover 13 is positioned by abutting, at an outer side surface of the circular ring portion 13b, a side surface of an annular stepped portion 53 projecting at an outer periphery of the rotational body 50. As illustrated in FIG. 1, the lip tip portion 25 of the outer side seal lip 20 slidably abuts an outer peripheral surface of the inner peripheral flange portion 13a of the dust cover 13, and a tip of the side lip 21 slidably abuts an inner side surface of the circular ring portion 13b of the dust cover 13. More specifically, the inner peripheral flange portion 13a of the dust cover 13 slidably contacts: the lip tip portion 25 of the outer side seal lip 20, and the circular ring portion 13b of the dust cover 13 slidably contacts the tip of the side lip 21.

As illustrated in FIG. 1, in the flange portion 23 of the outer side attachment ring 19, an inner peripheral portion 23b, the inner peripheral portion 23b is a part on the inner peripheral side to which the side lip 21 is attached, has a shape recessed toward the inner side so that the inner peripheral portion 23b is positioned on the inner side of an end portion of the cylinder portion 22 on the outer side or an outer peripheral portion 23a that is a part on the outer peripheral side connected with the cylinder portion 22. This shape of the flange portion 23 can provide a clearance that allows the side lip 21 to contact the dust cover 13 in a desired posture between the inner peripheral portion 23b of the flange portion 23 of the outer side attachment ring 19 and the dust cover 13 even when a clearance between the outer side attachment ring 19 and the dust cover 13 is small in the direction of the axis x.

As illustrated in FIG. 1, the dust cover 13 covers the flange portion 42 of the bracket 41 from the outer peripheral side at the outer peripheral flange portion 13c, and forms a gap 2 between the outer peripheral flange portion 13c and the flange portion 42. The dust cover 13 faces the flange portion 42 of the bracket 41 from the outer side at the circular ring portion 13b, and forms a gap 3 between the circular ring portion 13b and the flange portion 42. These small gaps 2 and 3 form a labyrinth seal. This labyrinth seal can achieve prevention of entrance of foreign matter such as muddy water, rainwater, and dust from the outside into the inside of the sealing structure 1 (sealing device 10).

The dust cover 13 is made of stainless steel and has excellent rust-resistant and rust-proofing properties. Accordingly, generation of rust on the slide portions of the outer side seal lip 20 and the slide portion of the side lip 21 can be suppressed, and the sealing function and sealing performance of the outer side seal lip 20 and the side lip 21 can be maintained for a long period of time. The material of the dust cover 13 is not limited to stainless steel, but may be another metal. However, it is preferable that a surface, in particular a slide surface of the material, is provided with rust-proofing processing such as rust-proofing plating processing.

As illustrated in FIG. 1, the contacted portion 30 includes an annular transition portion 32 that approaches the sealing device 10 side as the transition portion 32 progresses toward the outer side, and the transition portion 32 is positioned between the inner side seal lip 15 and the outer side seal lip 20. In the present embodiment, at the transition portion 32, the diameter of the contacted portion 30 becomes larger as the contacted portion 30 progresses from the inner side toward the outer side. Thus, a part of the peripheral surface 31 of the contacted portion 30 on the inner side of the transition portion 32 is a small diameter portion 33, a part of the peripheral surface 31 of the contacted portion 30 on the outer side of the transition portion 32 is a large diameter portion 34, and the diameter of the contacted portion 30 at the small diameter portion 33 is smaller than the diameter of the contacted portion 30 at the large diameter portion 34. The transition portion 32 smoothly connects the small diameter portion 33 and the large diameter portion 34. The lip tip portion 17 of the inner side seal lip 15 abuts the peripheral surface 31 of the contacted portion 30 at the small diameter portion 33, and the inner peripheral flange portion 13a of the dust cover 13 is fitted to the contacted portion 30 at the large diameter portion 34. Specifically, the diameter of the contacted portion 30 at the transition portion 32 becomes gradually larger and smoothly larger as the contacted portion 30 progresses toward the outer side. The transition portion 32 has, for example, a circular cone surface shape, and has a curved surface shape that is concaved toward the inner peripheral side or a curved surface shape that is convexed toward the outer peripheral side.

When the sealing structure 1 is being used, it is preferable that a space between the inner side seal portion 11 and the outer side seal portion 12 of the sealing device 10 be filled with grease so that the slide portion of the inner side seal lip 15 and the outer side seal lip 20 are lubricated with the grease. Thus, grease is supplied through the lubricant supply port (not illustrated) provided to the rotational body 50 so as to replenish the space between the inner side seal portion 11 and the outer side seal portion 12 with the grease. The supplied grease reaches the inner side seal lip 15 along the peripheral surface 31 of the contacted portion 30 through a space of the through-hole 51, presses and removes the lip tip portion 17 toward the outer peripheral side, and reaches the space between the inner side seal portion 11 and the outer side seal portion 12. Since the transition portion 32 extending toward the outer peripheral side is formed between the inner side seal lip 15 and the outer side seal lip 20 on the peripheral surface 31 of the contacted portion 30, the supplied grease is guided to the outer peripheral side along the transition portion 32 so that the grease is likely to be supplied between the inner side seal portion 11 and the outer side seal portion 12. The transition portion 32 can reduce flow path resistance for the grease upon supply of the grease. In this manner, in the sealing structure 1, replenishment of the space between the inner side seal portion 11 and the outer side seal portion 12 with grease can be easily and efficiently performed through the transition portion 32 included in the contacted portion 30.

Since the contacted portion 30 includes the transition portion 32, the dust cover 13 can be suppressed from contacting the peripheral surface 31 at the small diameter portion 33 upon attachment of the dust cover 13 to be attached to the large diameter portion 34, thereby suppressing damage on the peripheral surface 31 at the small diameter portion 33 of the contacted portion 30 that is a contact portion of the inner side seal lip 15.

According to the sealing structure 1 having the above-described configuration, the dust cover 13 forms the small gaps 2 and 3 between the dust cover 13 and the flange portion 42 of the bracket 41 to which the sealing device 10 is fitted, and the gaps 2 and 3 form a labyrinth seal. Thus, entrance of foreign matter such as muddy water, rainwater, and dust from the outside into the inside of the sealing structure 1 can be prevented on an upstream side on an entrance path for foreign matter by the labyrinth seal, and sealing performance against foreign matter can be improved.

In the sealing structure 1, in addition to the outer side seal lip 20, the side lip 21 is provided upstream of the outer side seal lip 20 on the entrance path for foreign matter, and the side lip 21 abuts the dust cover 13 and cuts off the entrance path for foreign matter. Thus, entrance of foreign matter into the inside of the sealing structure 1 can be further prevented, and the sealing performance against foreign matter can be further improved.

In the sealing structure 1, since the dust cover 13 is provided as a contact portion of the side lip 21, contact of the side lip 21 can be maintained when displacement of the side lip 21 in the direction of the axis x or decentering thereof from the axis x occurs, irrespective of the shape of the rotational body 50, for example, when a projection width of the stepped portion 53 of the rotational body 50 from the peripheral surface 31 of the contacted portion 30 in the radial direction is small.

In this manner, the sealing structure 1 according to the embodiment of the present disclosure can improve the sealing performance against foreign matter.

Figure 2:
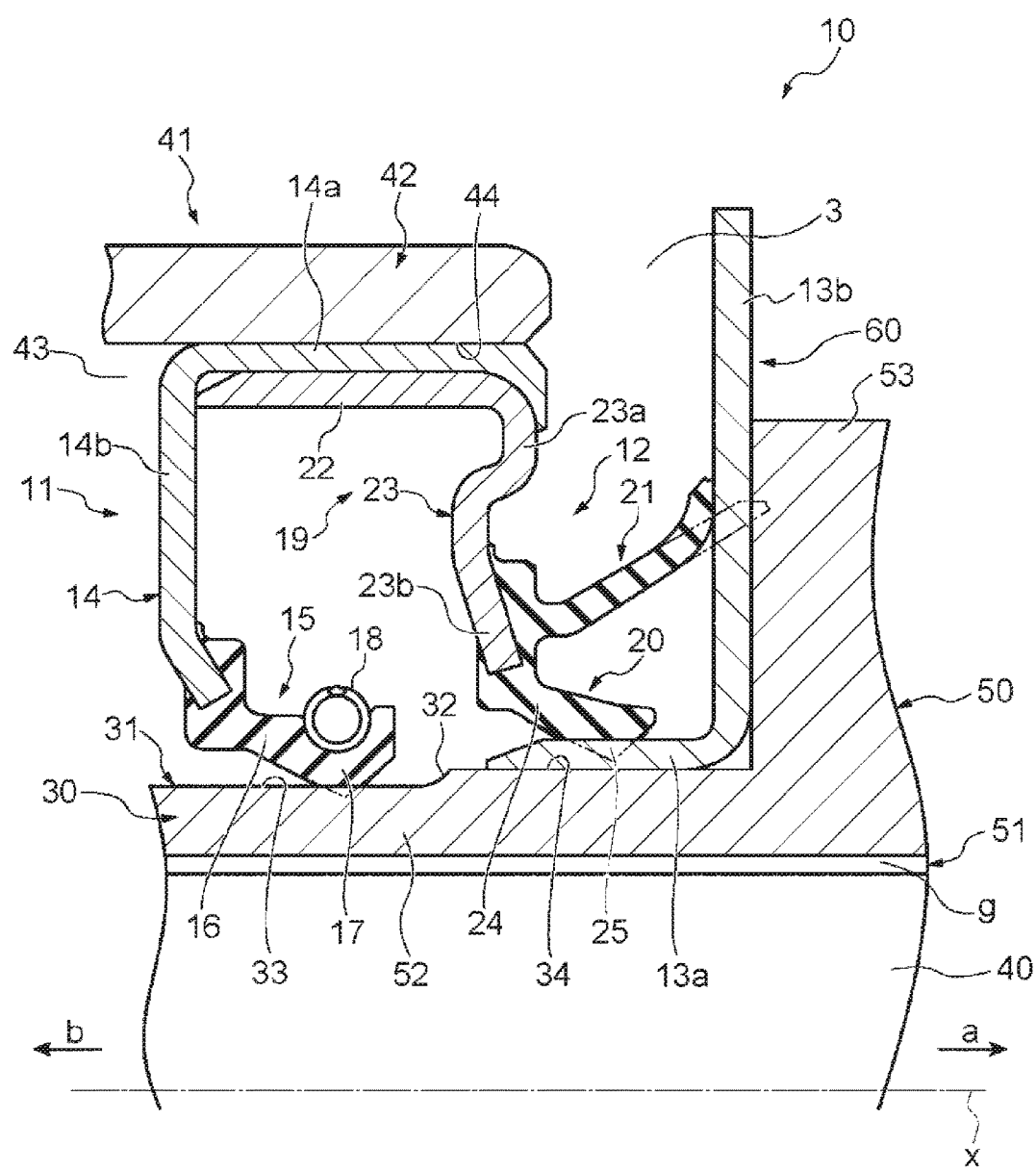
FIG. 2 is a cross-sectional view for illustrating a schematic configuration of a sealing structure according to a modification of the sealing structure according to the embodiment of the present disclosure illustrated in FIG. 1.

The following describes a modification of the above-described sealing structure 1 according to the embodiment of the present disclosure. FIG. 2 is a cross-sectional view for illustrating a schematic configuration of a sealing structure 5 according to the modification of the above-described sealing structure 1 according to the embodiment of the present disclosure. The sealing structure 5 according to the present modification is different from the above-described sealing structure 1 in the shape of a dust cover. Hereinafter, any component identical or similar to that of the above-described sealing structure 1 is denoted by an identical reference sign, description thereof will be omitted, and any different part will be described.

As illustrated in FIG. 2, the sealing structure 5 according to the present modification includes a dust cover 60 that is different from the dust cover 13 of the above-described sealing structure 1. Unlike the above-described dust cover 13, the dust cover 60 does not include the outer peripheral flange portion 13c covering the flange portion 42 of the bracket 41 from the outer peripheral side, but only includes the inner peripheral flange portion 13a and the circular ring portion 13b. Thus, the dust cover 60 does not have the gap 2, the circular ring portion 13b faces to the flange portion 42 from the outer side and forms the gap 3, and a labyrinth seal is formed only at the gap 3. The sealing structure 5 according to the present modification can achieve an effect identical to that of the above-described sealing structure 1.

Although the embodiment of the present disclosure is described above, the present disclosure is not limited to the above-described sealing structures 1 and 5 according to the embodiment of the present disclosure, but includes any aspect included in the concept of the present disclosure and the claims. Configurations may be selectively combined as appropriate to achieve at least part of the problem and effect described above. For example, the shape, material, disposition, and size of each component in the above-described embodiment may be changed as appropriate in accordance with a specific usage form of the present disclosure.

For example, the sealing device 10 needs to be attached to one of the shaft 40 and the rotational body 50 in a relatively irrotational manner, the contacted portion 30 needs to be formed in the other of the shaft 40 and the rotational body 50 in a relatively irrotational manner, the sealing device 10 is not limited to the attachment to the flange portion 42 of the bracket 41 as described above, and the contacted portion 30 is not limited to the formation in the inner side end portion 52 of the rotational body 50 as described above.

For example, the sealing device 10 and the contacted portion 30 may have shapes inverted in the directions of the outer peripheral side and the inner peripheral side in FIGS. 1 and 2. In other words, the inner side attachment ring 14 of the sealing device 10 may be fitted to the inner side end portion 52 of the rotational body 50, and the inner side seal lip 15 thereof may abut the inner peripheral surface 44 of the flange portion 42 of the bracket 41. In this case, the contacted portion 30 is formed in the inner peripheral surface 44 of the flange portion 42 of the bracket 41, and the dust cover 60 illustrated in FIG. 2 is fitted to the inner peripheral surface 44 of the flange portion 42 of the bracket 41. A gap is formed between an end portion of a disk portion 13b of the dust cover 60 on the inner peripheral side and the inner side end portion 52 of the rotational body 50, and a labyrinth seal is formed.

For example, the sealing device 10 may be disposed between the rotational body 50 and the shaft 40, the inner side attachment ring 14 may be fitted onto an inner peripheral surface of the through-hole 51 of the rotational body 50, and the inner side seal lip 15 may abut an outer peripheral surface of the shaft 40. In this case, the contacted portion 30 is formed on an outer peripheral surface of the shaft 40, and the dust cover 13 or 50 forms the gaps 2 and 3 or the gap 3 between the dust cover 13 or 50 and an end portion of the rotational body 50 on the outer side. In this case, a sleeve may be fitted to the shaft 40, and the contacted portion 30 may be formed on the sleeve.

For example, the sealing device 10 may be disposed between the rotational body 50 and the shaft 40, the inner side attachment ring 14 may be fitted onto the outer peripheral surface of the shaft 40, and the inner side seal lip 15 may abut the inner peripheral surface of the through-hole 51 of the rotational body 50. In this case, the contacted portion 30 is formed on the inner peripheral surface of the through-hole 51 of the rotational body 50, and the dust cover 60 illustrated in FIG. 2 is fitted onto the inner peripheral surface of the through-hole 51 of the rotational body 50. A gap is formed between an end portion of the disk portion 13b of the dust cover 60 on the inner peripheral side and the outer peripheral surface of the shaft 40, and a labyrinth seal is formed.

Although the sealing structures 1 and 5 according to the embodiment of the present disclosure are used at the trunnion suspension of a truck in the above description, the sealing structures according to the present disclosure are not limited to a sealing structure at the trunnion suspension of a truck, but are applicable to a mechanism of the same kind such as what is called a chassis component in a truck or another vehicle, a general industrial machine, a farming machine, and a construction machine.

What is claimed is:

1. A sealing structure for sealing a space between a shaft extending in an axis direction and a rotational body in which a through-hole extending in the axis direction is formed and the shaft is inserted through the through-hole with a space, the sealing structure comprising:
   a sealing device attached to one of the shaft and the rotational body in a relatively irrotational manner;
   a contacted portion formed in another of the shaft and the rotational body in a relatively irrotational manner, wherein
   the sealing device includes an inner side seal portion, an outer side seal portion, and a dust cover,
   the contacted portion includes a peripheral surface in an annular shape centered about the axis,
   the inner side seal portion includes an inner side attachment ring having an annular shape centered about the axis and attached to the one of the shaft and the rotational body in a relatively irrotational manner, and an inner side seal lip formed of an elastic body having an annular shape centered about the axis and attached to the inner side attachment ring, and the inner side seal lip extends from the inner side attachment ring toward an outer side that is a side toward which one direction along the axis direction faces, and slidably abuts the contacted portion at a part on the outer side,
   the outer side seal portion includes an outer side attachment ring having an annular shape centered about the axis and fitted to the inner side attachment ring of the inner side seal portion, an outer side seal lip formed of an elastic body having an annular shape centered about the axis and attached to the outer side attachment ring, and a side lip formed of an elastic body having an annular shape centered about the axis and attached to the outer side attachment ring on a side separate from the contacted portion than the outer side seal lip, the outer side seal lip is positioned on the outer side of the inner side seal lip, extends from the outer side attachment ring toward the outer side, and slidably abuts the dust cover at a part on the outer side, and the side lip extends from the outer side attachment ring toward the outer side and slidably abuts the dust cover at an end portion on the outer side, and the dust cover is an annular member attached to a peripheral surface of the contacted portion and forms a gap between the dust cover and a member to which the inner side attachment ring is attached.

2. The sealing structure according to claim 1, wherein the peripheral surface of the contacted portion includes an annular transition portion that approaches toward an sealing device side as the peripheral surface progresses toward the outer side, and the transition portion is positioned between the inner side seal lip and the outer side seal lip.

3. The sealing device according to claim 1, wherein the sealing device is fitted to a bracket holding the shaft on an outer peripheral side, the contacted portion is formed at an end portion of the rotational body on an inner side, the peripheral surface of the contacted portion is a surface facing toward the outer peripheral side, and the dust cover forms the gap between the dust cover and the bracket at an end portion on the outer peripheral side.

4. The sealing structure according to claim 1, wherein, in the outer side attachment ring, a part to which the side lip is attached is positioned on an inner side of an end portion, on the outer side, of a part attached to the inner side attachment ring.

5. The sealing structure according to claim 1, wherein, the dust cover is made of stainless steel.

* * * * *